Nov. 10, 1970     R. F. JOHNSTON     3,539,250
CONTINUOUS FILM MOTION PROJECTOR WITH MIRROR DRIVE SYSTEM
Filed March 7, 1968
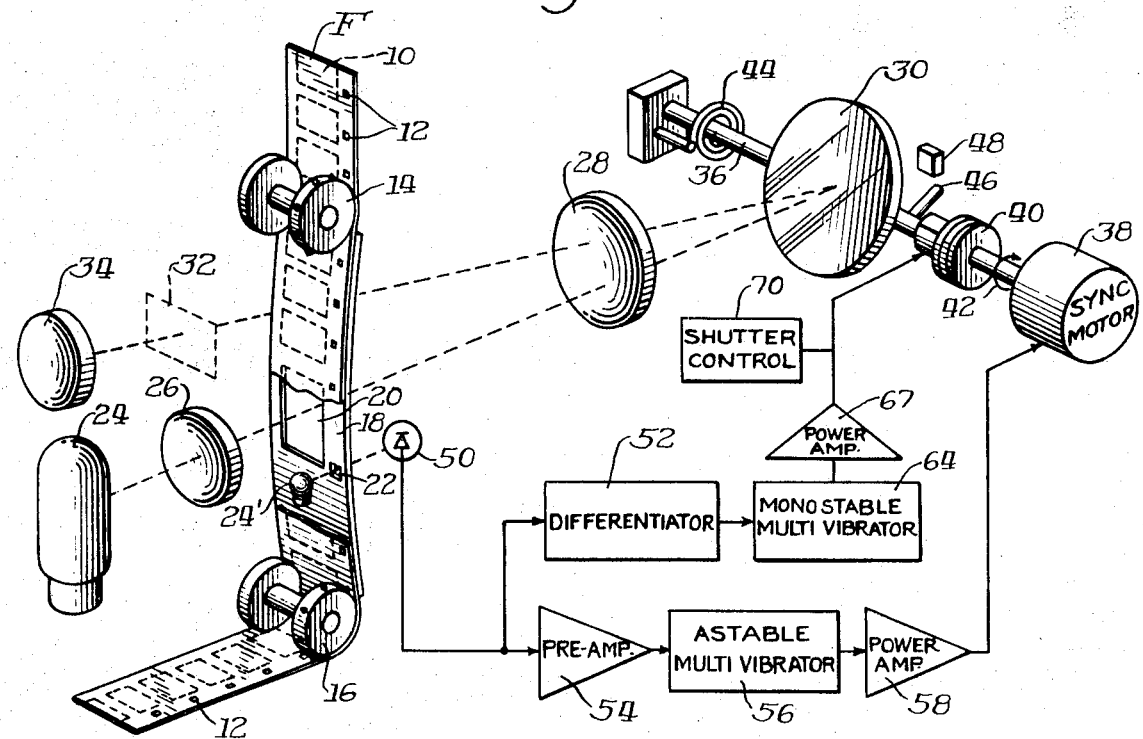
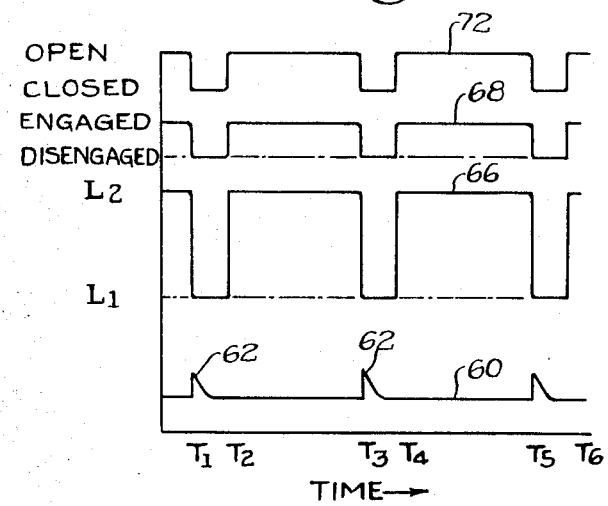
Inventor:
Robert F. Johnston
By *William J. ...*
*John E. ...* Attys.

United States Patent Office 3,539,250
Patented Nov. 10, 1970

3,539,250
CONTINUOUS FILM MOTION PROJECTOR WITH
MIRROR DRIVE SYSTEM
Robert F. Johnston, Wildwood, Ill., assignor to Bell &
Howell Company, Chicago, Ill., a corporation of Illinois
Filed Mar. 7, 1968, Ser. No. 711,250
Int. Cl. G03b 41/06
U.S. Cl. 352—107                                         5 Claims

ABSTRACT OF THE DISCLOSURE

Apparatus for a motion picture projector in which the film is continuously moved past a projection aperture and a projected image is caused to appear stationary on a screen by a motor driven oscillatable mirror. The oscillating action of the mirror is controlled by a sensor which reads synchronizing indicia on the film to initiate rocking of the mirror in a direction compensating for film movement so that the mirror moves with the film and projects an image appearing stationary on the screen. A spring return drives the mirror back to its start position.

---

This invention relates to motion picture projection apparatus and particularly to projection apparatus in which the film strip is moved continuously past the frame or projection aperture.

Many complex systems have been devised in which the film strip is moved continuously through a film gate and past a frame aperture. In many of these systems, tilting and/or rotating mirrors driven by complex mechanical or electrical means have been utilized to compensate for the film motion whereby a stationary image is produced on the screen. The need for trouble-free, simple and reliable projectors of this type has long been recognized by those skilled in the art.

The prior art teaches a number of means for producing stationary image on a screen. Some prior art devices provide reflecting means comprising semi-circular mirrors which are mounted for rotation and are tilted independently of each other by suitable cam members. Other prior art devices employ a plurality of mirrors arranged about a cylindrical drum which is rotated so that each successive image is reflected by each successive mirror. Yet other prior art uses photoelectric means for sensing perforations in the film for controlling a plurality of electrodynamic motors which pivot the projection mirror. While these devices have generally provided fairly satisfactory results, they all suffer from their inherent complex nature which adds to their initial cost and also provides an increased susceptibility to component malfunction.

It is, accordingly, a primary object of this invention to provide a new and improved apparatus and method for projecting motion pictures from continuously moving film.

Another object of this invention is the provision of new and improved apparatus and method for controlling the movement of a compensation projection mirror employed for projecting images from constantly moving film.

Yet another object of this invention is the provision of reliable and inexpensive means for driving a compensating projection mirror used to project images from a continuously moving film.

The aforementioned objects are achieved by oscillating a projection mirror from an initial or start position in a film tracking or following direction. The mirror is oscillatably driven by a synchronous motor connected to the mirror by an electromagnetic clutch. The electromagnetic clutch is deactivated at the end of the projection of each frame to allow a return spring to rotate the mirror in an opposite direction to the start position to enable projection of a succeeding frame. The speed of the synchronous motor is controlled by photoelectric cricuit means which reads light pulses emitted through sprocket holes in the film. Since the speed of the synchronous motor is proportional to the rate of film movement, the mirror accurately tracks and projects each succeeding frame without any apparent movement of the projected image. The photoelectric circuit means also controls the electromagnetic clutch at required cyclic intervals directly determined by the speed of the film to provide proper time synchronization of mirror oscillation with film movement.

Other objects and many of the attendant advantages of this invention will readily be appreciated by reference to the following detailed description when considered in connection with the accompanying drawing in which like numerals refer to like parts.

In the drawings:

FIG. 1 is a diagrammatic perspective view of a preferred embodiment of the invention; and FIG. 2 is a timing chart illustrating the cyclic relationship of elements of the preferred embodiment.

In the preferred embodiment of the invention, as illustrated in FIG. 1, a film strip F is provided with images (frames) or picture areas 10 and perforations or sprocket holes 12 arranged along one or both edges thereof as is well known in the art. Sprockets 14 and 16 engage film perforations 12 so as to move film strip F continuously through a film gate 18. Film gate 18 includes a frame aperture 20 and a control aperture 22. Frame aperture 20 is at least twice the length of image areas 10. Control aperture 22 is spaced along the edge of gate 18 in alignment with perforations 12. Gate 18 is preferably arcuately curved in order that the angular rate of advance of the film strip will be the same for all portions of the film in the film gate and to maintain a constant distance between the film and the mirror 30 throughout the frame aperture 20. In the event non-perforated film is used, sprocket perforations 12, which comprise a series of synchronizing indicia, may be replaced by light transmitting transparent areas which are exposed at the same time as the film strip. Light transmitting areas, or synchronizing indicia, therefore, may be defined as actual apertures in the film strip or exposed transparent areas.

The image area aligned with frame aperture 20 is alluminated by lamp 24 and condenser lens system 26. Light passing through image area 10 and aperture 20 passes through objective 28 and is reflectively projected by optical compensating projection mirror 30 back through objective 28 which forms a real image of area 10 at 32 which is substantially in the plane of aperture 20 and to one side of gate 18. The image is then projected by means of a lens 34 onto a suitable image receiving surface such as a movie screen or photosensitive means within television projection equipment.

Compensating mirror 30 is pivotally mounted for rotation about an axis 36 which is normal to the direction of film movement and is parallel to the axis of curvature of gate 18. Mirror 30 is rotated periodically or oscillated by means of a variable speed synchronous motor 38 drivingly connected to the mirror by means of an electromagnetic clutch 40. Motor 38 is continuously rotated in the direction indicated by arrow 42. When electromagnetic clutch 40 is actuated, motor 38 rotates the mirror in the direction of arrow 42. When the electromagnetic clutch is deactuated, a coil spring 44 rotates the mirror in a direction opposite to that of arrow 42 to return the mirror to an initial position determined by a lug 46 which engages a stop 48 fixed on the projector frame. When the mirror is in the initial position determined by lug 46 and stop 48, it is aligned with frame aperture 20 so as to receive the image 10 of a frame that has just moved into the frame aperture 20. The electromagnetic clutch 40 is then actuated (by means to be later described) so as to rotate the mirror to "follow" the image through its traversal of frame aperture 20 in such a manner as to project a stationary image through lens 34.

The illustrated optical system forms an image of unity magnification by reflecting the light from the oscillatable compensating projection mirror 30 back through objective 28. This is a preferred system since the mirror's dimensions are reduced to a minimum. However, the invention is applicable to other systems in which mirror 30 reflects the light from one side so that it passes through objective 28 only once. In such a system, objective 28 serves as the projection lens and mirror 30 must be considerably larger.

Actuation of electromagnetic clutch 40 must be controlled so that movement of mirror 30 is correlated with movement of the film. This correlation is accomplished by means which will now be discussed. Movement of a perforation 12 into alignment with control aperture 22 directs light from a lamp 24' into a photosensor 50. The movement of the perforations past control aperture 22 accordingly results in a series of low voltage pulses from photosensor 50 (either solid state or photosensitive tube) at intervals proportional to the film speed. The low voltage pulses from photosensor 50 are applied to a differentiator 52 and a preamplifier 54. Preamplifier 54, a free-running or astable multivibrator 56, a power amplifier 58 and their associated connections comprise a first, or motor, circuit. The output of preamplifier 54 is fed into free-running multivibrator 56, which has a normal frequency of approximately 48 Hz. Assuming a projection rate of 24 frames per second, the pulse from preamplifier 54 occurs at a frequency of 24 Hz., since 24 sprocket holes in the film move past aperture 22 each second. The free-running multivibrator 56 includes a conventional synchronizing means for synchronizing alternate output pulses with the output of preamplifier 54. The timing of the output pulses from free-running multivibrator 56 can vary over a small range so as to coincide with small variations in the output frequency of preamplifier 54 which are created by small variations in the film speed. Consequently, the frequency of the output pulses from free-running multivibrator 56 is amplified by means of a power amplifier 58. The frequency of output pulses from power amplifier 58 will also obviously vary in accordance with variations in the film speed. The output of power amplifier 58 is connected to synchronous motor 38. Therefore, it will be readily apparent that variations in the film speed will result in variations in the speed of synchronous motor 38. In other words, an increased film speed will result in a corresponding increase in the speed of motor 38 and a decrease in the film speed will result in a corresponding decrease in the speed of motor 38.

As noted above, the output from photosensor 50 is also fed into differentiator 52 and then into monostable multivibrator 64, which components and their associated connections form a second, or clutch, circuit. In FIG. 2, the output of differentiator 52 is designated 60, and the output of multivibrator 64 is indicated by 66. Each input pulse from photosensor 50 into differentiator 52 causes differentiator 52 to emit a spiked pulse 62, which is fed into a monostable multivibrator 64. Each spiked pulse 62 causes the output of monostable multivibrator 64 to drop substantially instantaneously to a lower level $L_1$. The output of the monostable multivibrator remains at the lower level for a given time period equal to $T_2-T_1$, and then returns to a higher level $L_2$ as shown in FIG. 2. The output remains at this higher level until the next pulse 62 occurs. The output of the monostable multivibrator 64 is fed into a power amplifier 67. This amplifier increases the power output of the multivibrator so that the output controls the elctromagnetic clutch 40. Clutch 40 is engaged during the time the monostable multivibrator output is at the higher level $L_2$, and is disengaged when the output of monostable multivibrator 64 is at lower level $L_1$. The cyclic operation of the clutch is illustrated by designator 68 in FIG. 2.

It is obviously not desirable to project an image during the return of mirror 30 to the initial position by spring 44. Therefore, an electrical shutter control 70 is concurrently actuated with clutch 40 by the output of monostable multivibrator 64. Any conventional electrically operable shutter can be employed for this purpose. The shutter can be located at any convenient point in the optic path as determined by the particular overall configuration of the projection equipment. The cyclic operation of shutter control 70 is illustrated by waveform 72 in FIG. 2. Note that the shutter is closed during the time that the clutch is disengaged. This is the interval when the mirror is being returned to its initial position by the energy stored in spring 44.

Obviously, many modifications, variations and alternative structures of the present invention are possible in the light of the above teachings.

For example, magnetic sensing means for sensing magnetic synchronizing spots on the film could be employed in place of the photoelectric means.

It is therefore to be understood that within the scope of the appended claims the invention may be practiced otherwise than as specifically described.

The embodiments of the invention in which an exclusive property or privilege is claimed are defined as follows:

1. In a continuous film feed motion picture projector for projecting frame images from a film having a sequence of synchronizing indicia thereon, the combination comprising:
means sensing said indicia and producing an output signal in response thereto,
a variable speed motor,
a rotatable mirror for receiving successive frame images projected from said film and for stabilizing and reflectively projecting said images to image receiving means,
a selectively actuated, electrically operable clutch drivingly connecting said motor to said mirror,
first circuit means responsive to said output signal for driving said motor in synchronism with said film, and
second circuit means responsive to said output signal for selectively actuating said clutch so that said mirror is rotated by said motor at cyclic intervals to track and project successive frames.

2. The device of claim 1 wherein said variable speed motor is a synchronous motor and wherein said first circuit means includes a multivibrator and output frequency of which is determined by said output signal, said multivibrator being coupled to said synchronous motor for determining the speed thereof.

3. The device of claim 2 wherein said means for sensing said indicia includes photoelectric means.

4. The device of claim 3 wherein said sensing means includes means for projecting a light source through successive light transmitting areas in said film.

5. An apparatus in accordance with claim 3, which further includes means for rotating said mirror opposite to the direction of rotation caused by said motor during disengagement of said motor from said mirror of said clutch.

References Cited

UNITED STATES PATENTS

| | | | |
|---|---|---|---|
| 1,221,407 | 4/1917 | Amet | 352—35 |
| 2,215,464 | 9/1940 | Dorgelo | 352—109 |
| 2,506,198 | 5/1950 | Charles | 352—109 |
| 2,843,006 | 7/1958 | Tyler | 352—109 |
| 2,948,203 | 8/1960 | Hadley | 352—92 |
| 3,432,228 | 3/1969 | Hellmund | 352—169 |

NORTON ANSHER, Primary Examiner

M. H. HAYES, Assistant Examiner

U.S. Cl. X.R.

352—92, 106, 109